J. W. MINOR.
Three-Wheeled Dray.
No. 167,776. Patented Sept. 14, 1875.
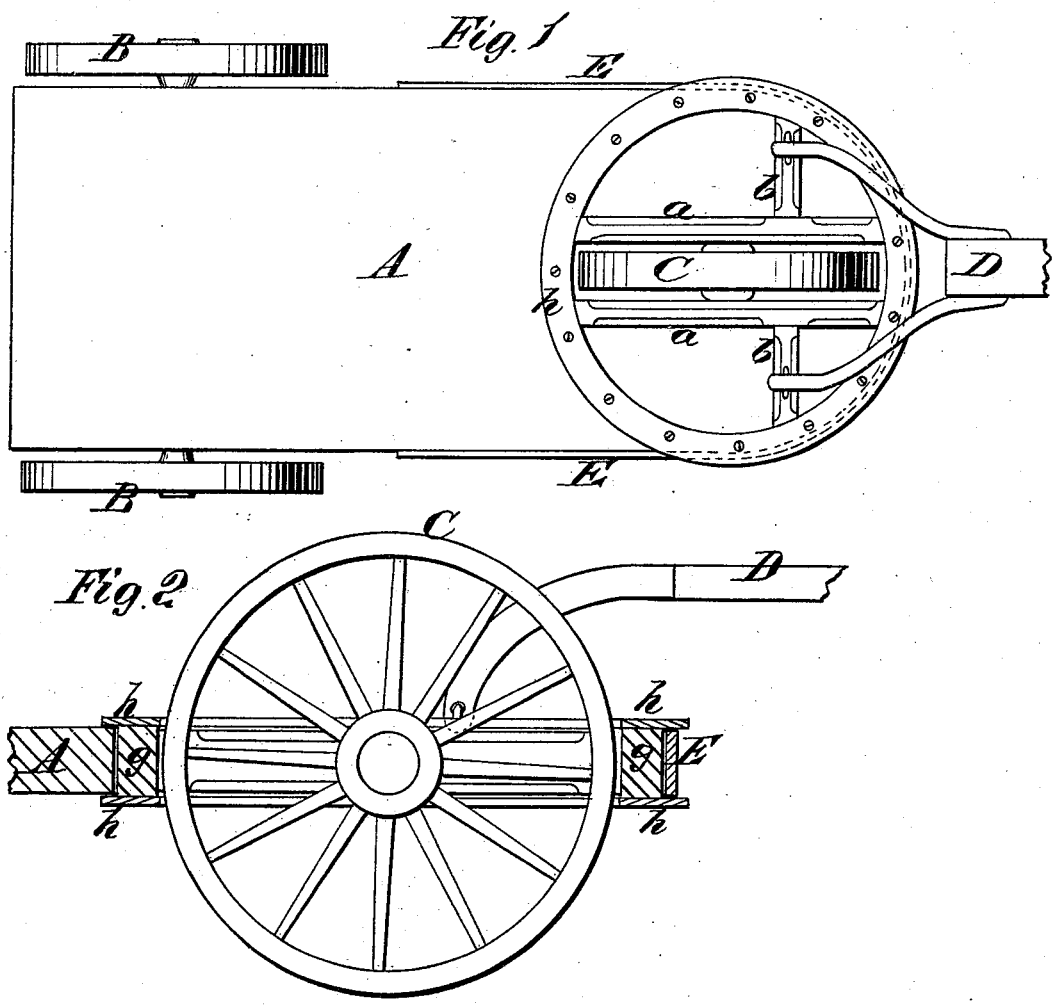

UNITED STATES PATENT OFFICE.

JOHN W. MINOR, OF MIDDLEBOROUGH, MASSACHUSETTS.

IMPROVEMENT IN THREE-WHEELED DRAYS.

Specification forming part of Letters Patent No. 167,776, dated September 14, 1875; application filed March 20, 1875.

*To all whom it may concern:*

Be it known that I, JOHN W. MINOR, of Middleborough, in the county of Plymouth and State of Massachusetts, have invented a new and valuable Improvement in Three-Wheeled Drays; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my dray, and Fig. 2 is a longitudinal vertical sectional view of the same.

This invention has relation to the front connection of the third wheel of a three-wheeled vehicle, and is an improvement on the device for which Letters Patent were granted to Minor and Ward on the 17th day of September, 1867.

The nature of my invention consists in a third or guiding wheel, having its axle-bearings in bars, which are rigidly secured to a horizontal flanged ring, which is movable about its axis, in combination with an embracing-strap, which is secured to the bed of the vehicle, as will be hereinafter explained. It also consists in a ring formed of two metal flanges, which are bolted to an intermediate wooden body, and adapted to the bed of the vehicle, as will be hereinafter explained.

In the annexed drawings, A designates the body of a dray, having two rear wheels, B B, and a front guiding-wheel, C. The axle of this last-named wheel has its bearings in two parallel bars, $a\,a$, which are rigidly secured to a horizontal flanged ring. Two short transverse bars, $b\,b$, are rigidly secured to bars $a\,a$ and to the flanged ring, and to these bars $b\,b$ a draft-tongue, D, is pivoted. The flanged ring is composed of a central body, $g$, made of hard wood, and two flanges, $h\,h$, which are made of metal, and firmly secured to the top and bottom sides of the body by means of bolts. I thus make a very light ring, which at the same time possesses great strength and durability.

The rear part of the flanged ring receives the front semicircular end of the bed of the dray, and the front part of the flanged ring receives a strong strap, E, which is rigidly secured to the sides of the dray-bed. The strap E thus holds the flanged ring in its place and allows it to turn about its axis.

What I claim as new, and desire to secure by Letters Patent, is—

1. A third or guiding wheel, C, having its axle-bearings in bars which are rigidly secured to a horizontal flanged ring movable about its axis, in combination with the embracing-strap E, secured to the bed A of the vehicle, substantially as described.

2. The flanged ring formed of two metal flanges, $h\,h$, bolted to an intermediate wooden body, $g$, and applied to the bed A, substantially as described.

In testimony that I claim the above I have hereunto subscribed my name in the presence of two witnesses.

JOHN W. MINOR.

Witnesses:
 JOS. B. LOOMIS,
 GEORGE E. UPHAM.